United States Patent [19]
Griebeler

[11] Patent Number: 5,315,244
[45] Date of Patent: May 24, 1994

[54] MAGNETIC SENSOR WITH LAMINATED FIELD CONCENTRATING FLUX BAR

[75] Inventor: Elmer L. Griebeler, Chesterland, Ohio

[73] Assignee: Visi-Trak Corporation, Cleveland, Ohio

[21] Appl. No.: 925,298

[22] Filed: Aug. 5, 1992

Related U.S. Application Data

[63] Continuation of Ser. No. 653,685, Feb. 11, 1991, abandoned, which is a continuation-in-part of Ser. No. 437,657, Nov. 17, 1989, Pat. No. 4,992,733.

[51] Int. Cl.$^5$ .................. G01B 7/14; G01R 33/02
[52] U.S. Cl. .................. 324/207.21; 324/207.13; 324/207.24; 338/32 R
[58] Field of Search .............. 324/207.12, 207.13, 324/207.15, 207.2, 207.21, 207.24, 207.25, 174; 338/32 R, 32 H; 307/309

[56] References Cited

U.S. PATENT DOCUMENTS

| | | | |
|---|---|---|---|
| 3,846,697 | 11/1974 | Cila et al. | 324/207.21 |
| 4,204,159 | 5/1980 | Sarian et al. | 324/232 |
| 4,733,177 | 3/1980 | Pawletko | 324/207.21 |
| 4,922,197 | 6/1990 | Juds et al. | 324/207.21 |

Primary Examiner—Walter E. Snow
Attorney, Agent, or Firm—Fay, Sharpe, Beall, Fagan, Minnich & McKee

[57] ABSTRACT

An improved magnetic sensor for use in measuring the position, velocity and/or direction of movement of an object having alternating zones of different magnetic conductivity in the direction of movement, comprises a permanent magnet member having a pole face facing the moving object and having an axis transverse to the direction of movement thereof. A pair of sensor elements are mounted on the permanent magnet pole face, one on each of the opposite sides of the magnet axis in the direction of movement of the object. A laminated flux bar having strips of ferromagnetic material of high permeability and strips of ceramic material having low permeability is mounted on the pair of sensor elements. The ferromagnetic laminations of the flux bar concentrate the field of the permanent magnet member through the sensitive area of each of the sensor elements such that the signal-to-noise ratio of the overall magnetic sensor is increased, decreasing the sensors sensitivity to changes in temperature and changes in the gap between the object and the sensor. The ram in a metal diecasting machine can be positioned using the sensor and/or the position, velocity and direction of movement of the ram can be determined through the use of improved magnetic sensor.

18 Claims, 7 Drawing Sheets

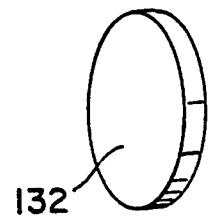
FIG. 11A  FIG. 11B
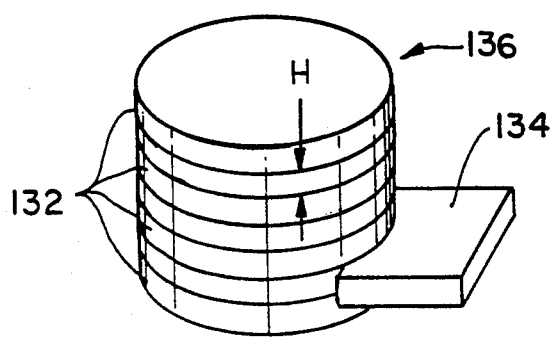
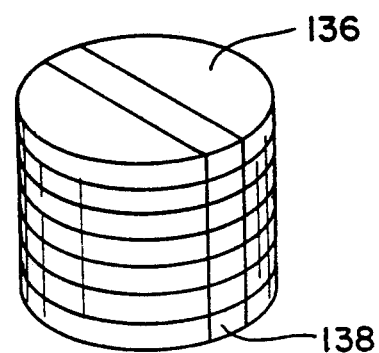
FIG. 11C  FIG. 11D
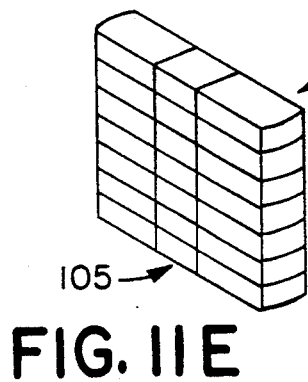
FIG. 11E
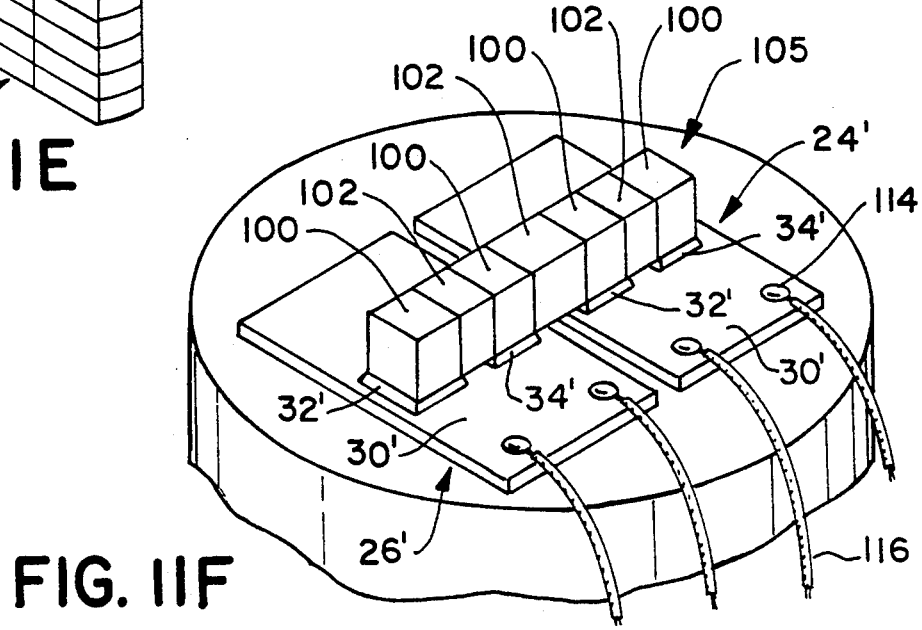
FIG. 11F

MAGNETIC SENSOR WITH LAMINATED FIELD CONCENTRATING FLUX BAR

This application is a continuation of co-pending application Ser. No. 07/653,685 filed Feb. 11, 1991, now abandoned, which was a continuation-in-part of co-pending application Ser. No. 07/437,657 filed Nov. 17, 1989, now U.S. Pat. No. 4,992,733.

BACKGROUND OF THE INVENTION

This invention relates to the art of magnetic sensing devices and, more particularly, to an improved magnetic sensor for use in a system for measuring the position, velocity and/or direction of a moving object having alternating zones of different magnetic conductivity in the direction of movement. This invention also relates to my prior co-pending application, Ser. No. 437,657 filed Nov. 17, 1989, now U.S. Pat. No. 1,992,733, with respect to which the present application is a continuation-in-part.

It is, of course, well known to provide a transducer or motion sensor comprised of a permanent magnet having a pole face facing an object whose motion is to be detected and which pole face is provided with a magnetic field sensitive sensor element coaxial with the axis of the pole face. Such a motion sensing device is adapted to be positioned with the pole face and sensor element facing and spaced by an air gap from an object such as an axially reciprocable rod or a rotatable toothed gear formed of a magnetically conducting material. The rod may, for example, be provided with circumferentially extending grooves or threads, providing alternating lands and grooves, and the teeth of the gear are of course circumferentially spaced apart, whereby the rod lands and grooves, and the gear teeth and spaces therebetween, provide alternating zones of different magnetic conductivity in the direction of movement of the object. The lines of flux of the magnetic field of the permanent magnetic pass through the alternating zones as the object moves relative to the magnetic sensor, causing flux changes and inducing a current in the magnetic sensor which is proportional to the position of the moving object. The output of the magnetic sensor is applied to a suitable auxiliary electronic device to provide some desired function or display. It will be appreciated of course that the magnetic field of the permanent magnet is uniform with respect to a magnetic sensor centered on the pole face thereof so as to be coaxial with the axis of the pole face.

Often, it is desirable in connection with such a motion detecting device to provide for determining the direction of movement of the object. This can be achieved by simply providing two magnetic sensor elements on the pole face on opposite sides of the axis of the pole face and spaced apart in the direction of movement of the object by a distance proportional to the pitch of the rod lands and grooves or gear teeth. With such an arrangement, the flux changes at any given time resulting from the passage of the zones of different magnetic conductivity relative to each of the magnetic sensors will be different, thus producing different signals at the auxiliary electronic device capable of providing directional information with respect to the moving object. However, the simple mounting of two magnetic sensor devices on the pole face causes problems with respect to the signal output from the individual magnetic sensors. In this respect, the offset of the two magnetic sensors relative to the center of the magnet provides a magnetic field in the region of each of the magnetic sensors that is not uniform. In this respect, the magnetic flux on the side of each sensor which is nearest the center of the magnet is different from that on the side of the sensor furthest away from the center of the magnet. More particularly, each sensor element generally has a positive leg and a negative leg each producing an output signal to a comparator or differentiating device, and these legs are adjacent one another in the direction of movement of the object and, thus, are spaced differently with respect to the center of the magnet. Accordingly, the pattern of the magnetic field flux lines relative to the two legs is different, whereby the outputs of the two legs are different. This difference presents problems with respect to obtaining accurate and/or intelligent information with respect to movements of the object. It has been proposed to place a resistor in each leg of each sensor element to compensate for the effect of the difference in the flux field thereacross and, while such an arrangement does compensate for the imbalance, it does so only with respect to a given air gap between the sensor and moving object, and a given temperature in that the sensors are temperature sensitive. Therefore, any change in the air gap and/or temperature introduces error into the readings. A further problem encountered in connection with simply offsetting two sensor elements on laterally opposite sides of the center of the permanent magnet pole face is a considerable decrease in the signal-to-offset error ratio relative to that which exists with a single sensor element coaxial with the magnet axis. In this respect, the offset error level with two offset sensors can be thirty times the offset error level with a single centered sensor, and such a high offset error level makes it extremely difficult to obtain intelligent output signals from the sensors.

As the pair of magnetic sensor elements are inherently fragile, protective casings have been provided wherein the permanent magnet and sensors mounted thereto are placed within a housing and held in position therein by an epoxy material. To provide for protection between the sensor elements and the axially reciprocal rod or rotatable toothed gear, a thin sheet of stainless steel is provided on one side of the housing and between the sensor elements and the moving object. In addition to the physical protection provided the sensor elements by the stainless steel plate, electrical protection against shorts is necessary on the side of the stainless steel plate immediately adjacent the sensor elements. Most often this protection is provided in the form of a thin layer of an insulative material sprayed onto the stainless steel plate. The addition of these protective features, however, necessitate that the magnetic field produced by the permanent magnet must pass through additional layers of material before encountering the object being sensed. Accordingly, the overall sensitivity of the magnetic sensor is reduced.

In addition to the detrimental effects on overall sensor sensitivity, the stainless steel plate is oftentimes destroyed in use through contact between itself and a moving grooved rod or rotatable toothed gear. The vibrational effects encountered in an industrial environment combined with machining inaccuracies in the object being sensed, too often leads to contact between the object being sensed and the stainless steel protective plate, resulting from a scratching or galling of the plate and subsequent failure of the sensing device.

The present invention will be described in detail hereinafter in conjunction with magnetic field sensitive sensor elements in the form of silicon magnetoresistors mounted on a thin ferrite base. This type of sensor element adds an additional problem in connection with the manufacture of permanent magnet type transducers. In this respect, silicon magnetoresistors are extremely fragile, whereby a great deal of care must be exercised in connection with the mounting thereof on the pole face of a permanent magnet. In this respect, the attraction of the magnet during the mounting operation can impact the sensor against the pole face with such force as to shatter the fragile sensor element.

SUMMARY OF THE INVENTION

In accordance with the present invention, the pole face of a permanent magnet type transducer is provided with a pair of magnetic field sensitive sensor elements offset on opposite sides of the pole face axis in the direction of relative movement between the transducer and object, and the magnetic field in the area of the sensor elements is distorted so as to balance the magnetic field across each sensor element in the direction of relative movement between the sensor and object. More particularly, in this respect, the normal, radial pattern of lines of the flux in the magnetic field generated by the permanent magnet is distorted in the area of each sensor element so as to extend transversely with respect to the direction of relative movement between the sensor and object, whereby the magnetic field between the radially innermost and radially outermost portions of the sensor element with respect to the magnet axis and the direction of movement is balanced. Thus, the output signals from the positive and negative legs of each of the sensor elements are more balanced, the offset error level is minimized, and more accurate readings are obtained. Moreover, these advantages are achieved in accordance with the present invention without restriction to a given air gap and/or ambient temperature, and without the use of resistors to obtain compensation for the imbalance of the magnetic field relative to the sensor element.

In accordance with an embodiment of the invention, distortion of the magnetic field in the area of each of the sensor elements and thus a balanced effect of the field across each of the sensor elements is achieved by providing a ferromagnetic flux bar of high permeability between the pole face of the permanent magnet and the two sensor elements. The flux bar extends in the direction of movement of the object relative to the sensor elements and, preferably, is of a width generally corresponding to the dimension of the sensor elements in the direction transverse to the direction of movement of the object. The differential legs of the sensor are transverse to the length direction of the flux bar, and the preferred width of the bar optimizes distortion of the magnetic field in the area of each sensor such that the flux lines are transverse to the length dimension of the flux bar with respect to both legs of the sensor. Therefore, the flux field effecting both legs of each sensor is essentially the same. A further advantage realized in accordance with the foregoing embodiment resides in the fact that the sensing elements can be of the silicon magnetoresistor type in which the ferrite base is preliminarily mounted on the flux bar before the latter is mounted on the pole face of the permanent magnet. This avoids fighting the magnetic field when mounting the sensor element and thus enables assembly with the permanent magnet without the same degree of care or the use of special tools otherwise required to avoid damaging or destroying the sensor elements during assembly with the permanent magnet.

In accordance with a preferred embodiment of the invention, local distortion of the magnetic field in the area of each of the sensor elements and thus, a balanced effect of the field across each of the sensor elements, is achieved by providing a flux bar having laminations of ferromagnetic material of high permeability interposed between layers of non-magnetic ceramic material. The flux bar is placed between the two sensor elements mounted on the pole face of the permanent magnet, and the object being sensed. The laminated flux bar extends in the direction of movement of the object relative to the sensor elements and, preferably, is of a width generally corresponding to the dimension of the sensor elements in a direction transverse to the direction of movement of the object. The differential legs of the sensor are transverse to the length direction of the laminated flux bar, and the preferred width of the bar optimizes concentration of the magnetic field in the area of each sensor such that the flux lines pass through sensitive areas of each sensor as guided by the highly permeable ferromagnetic flux bar laminations. A further advantage realized in accordance with the foregoing preferred embodiment resides in the effect that the sensing elements can be of the silicon magnetoresistor type in which the sensor elements are preliminarily mounted on the laminated flux bar before the ferrite base of the sensors are mounted on the pole face of the permanent magnet. This avoids fighting the magnetic field when mounting the sensor elements and thus enables assembly with the permanent magnet without the same degree of care or the use of special tools otherwise required to avoid damaging or destroying the sensing elements during assembly with the permanent magnet.

It is accordingly an outstanding object of the present invention to provide an improved permanent magnet type transducer for use in determining the position, velocity and/or direction of movement of an object relative thereto and which object has alternating zones of different magnetic field sensitive sensor elements on opposite sides of the center of the permanent magnet with respect to the direction of movement of the object relative thereto.

Another object is the provision of a transducer of the foregoing character having improved accuracy with respect to the readout of the magnetic field sensitive sensors.

A further object is the provision of a transducer of the foregoing character wherein the flux field generated by the permanent magnet is distorted in the area of each of the magnetic field sensitive sensor elements such that the lines of flux in the areas of the elements are constrained from a radial to a transverse direction with respect to the direction of movement of the object relative to the transducer.

Still further, an object is the provision of a transducer of the foregoing character wherein the flux field generated by permanent magnet is locally distorted in the area of each of the magnetic field sensitive sensor elements such that the lines of flux are concentrated and constrained to pass through the sensitive areas of the sensor elements.

Still, another object is the provision of a transducer of the foregoing character wherein the magnetic field sensitive sensor elements are mounted on a ferromagnetic flux bar of high permeability which in turn is mounted on the pole face of the permanent magnet such that the flux bar distorts the magnetic field in the area of each of the sensor elements so that the magnetic field is balanced across the sensor element with respect to the direction of movement of the object relative thereto.

Still further, another object is the provision of a transducer of the foregoing character wherein the magnetic field sensitive sensor elements are mounted on a laminated flux bar on areas of ferromagnetic material of high permeability. The laminated flux bar with the sensor elements mounted thereon is in turn mounted on the pole face of the permanent magnet such that the sensor elements are interposed between the laminated flux bar and the permanent magnet in order that the laminations of high permeability may concentrate the magnetic field in the area of each of the sensor elements so that the magnetic field is concentrated to pass through the sensitive areas of the sensor elements.

Still a further object is to provide a transducer of the foregoing character in which the sensor elements generate accurate output signals proportional to the magnetic field shape in the vicinity of the sensor elements independent of limited air gap and ambient temperature parameters.

Still a further object is the provision of an improved transducer of the foregoing character having a high signal-to-offset error ratio to enhance readability of the output signals of the sensors.

Another object is the provision of a transducer of the foregoing character in which the magnetic field sensitive sensor elements are structurally fragile and wherein assembly of the sensors and permanent magnet can be achieved in a manner which requires less concern with respect to damage or destruction of the sensor elements during the assembly operation.

BRIEF DESCRIPTION OF THE DRAWINGS

The foregoing objects, and others, will in part be obvious and in part pointed out more fully hereinafter in conjunction with the written description of a preferred embodiment of the invention illustrated in the accompanying drawings wherein:

FIGS. 11a–11f illustrate the manufacturing process used to produce the laminated field distorting flux bar of the invention.

DESCRIPTION OF THE PREFERRED EMBODIMENTS

Figure 1:
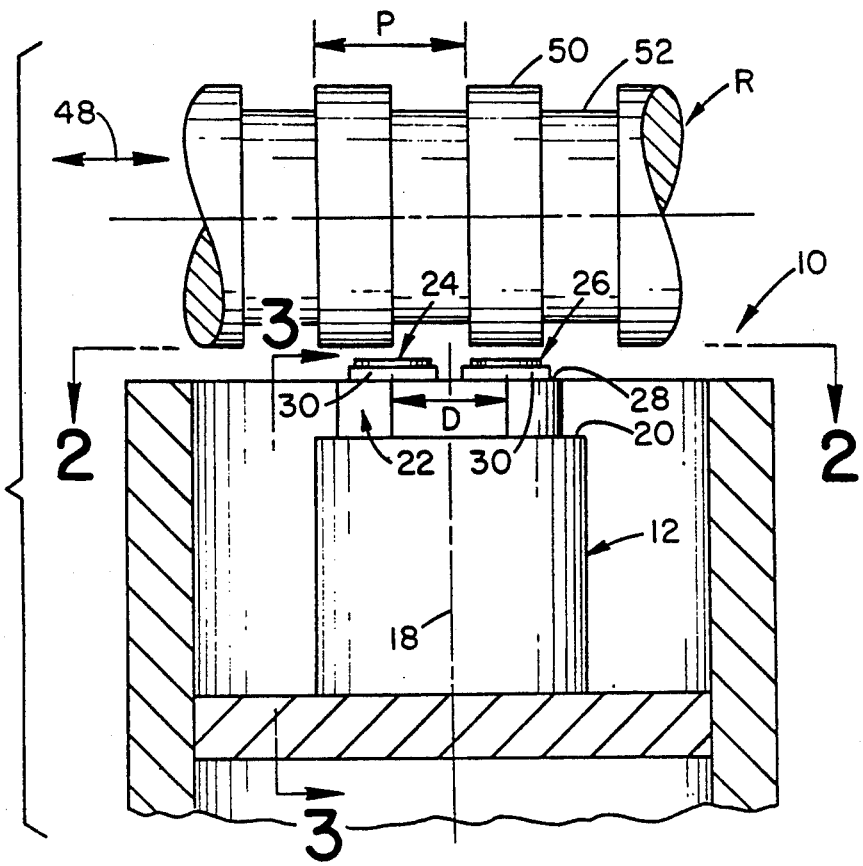
FIG. 1 is an elevation view, partially in section, of a transducer in accordance with the present invention and showing the transducer in motion sensing relationship with respect to a reciprocating object.
Figure 2:
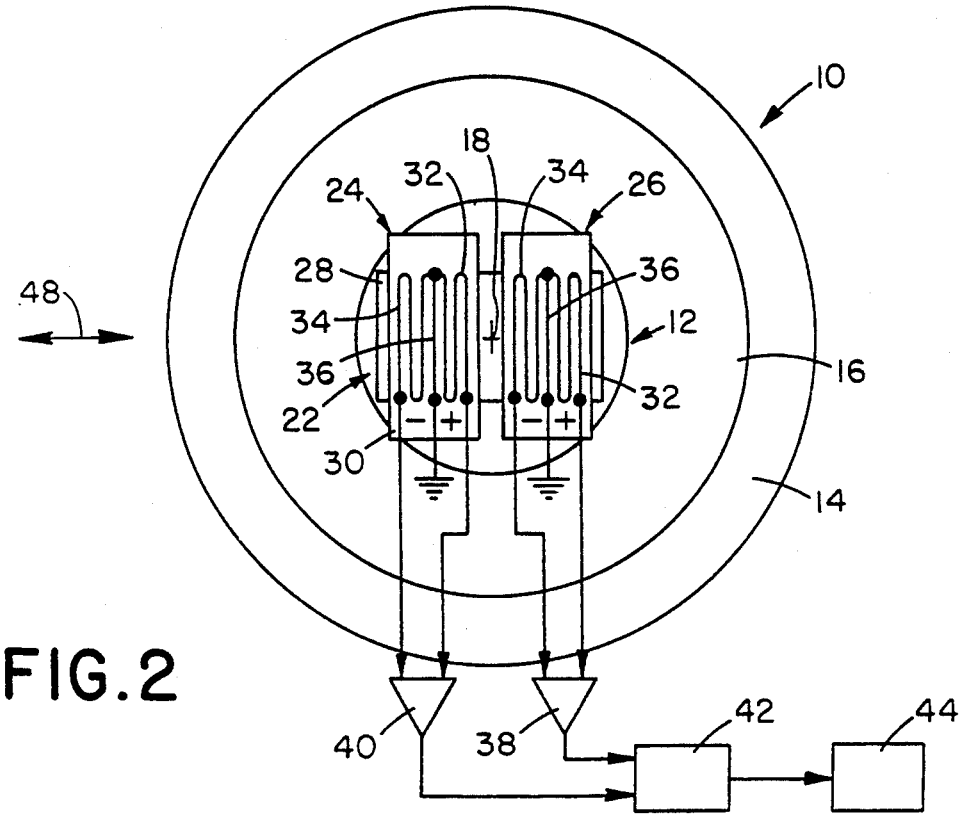
FIG. 2 is a plan view of the transducer taken along line 2—2 in FIG. 1 and schematically showing output connections from the sensor elements.
Figure 3:
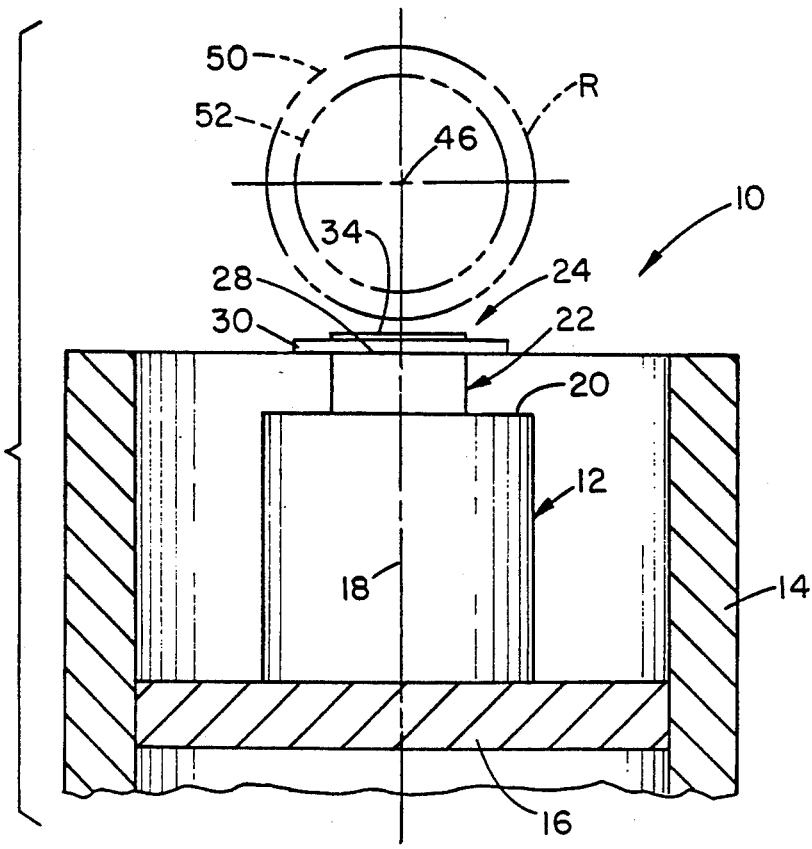
FIG. 3 is a sectional elevation view of the transducer taken along line 3—3 in FIG. 1.

With reference now in particular to the drawings wherein the showings are for the purpose of illustrating preferred embodiments of the invention only and not for the purpose of limiting the invention, FIGS. 1–3 illustrate a transducer 10 comprised of a cylindrical body 12 of permanent magnetic material such as samarium cobalt suitably mounted in a housing of mild steel defined by a cylindrical wall 14 radially spaced from the surrounding magnet 12 and a bottom wall 16 to which magnet 12 is suitable secured. Permanent magnet 12 has an axis 18 and a planar pole face 20, and a ferromagnetic flux bar 22 of high permeability, such as mild steel, is mounted on pole face 20 such as by an epoxy adhesive. Finally, a pair of magnetic field sensitive sensor elements 24 and 26 are mounted on outer surface 28 of flux bar 22 such as by an epoxy adhesive.

In the embodiment shown, each of the sensor elements 24 and 26 is preferably a silicon magnetoresistor type sensor element available from Siemens Components Corp. of Iselin, N.J. under the latter's product designation FT-100L60. Each of the sensor elements 24 and 26 is comprised of a thin base 30 of ferrite on which is mounted a differential silicon resistor having a positive leg 32, a negative leg 34 and a ground leg 36. As shown in FIG. 2, legs 32 and 34 of each of the sensors 24 and 26 are connected to differentiators 38 and 40, respectively, having outputs to suitable electronic processing devices 42 and 44 as set forth more fully hereinafter.

As will be appreciated from FIGS. 1–3, transducer 10 is adapted to be positioned relative to a moving object of magnetically conducting material, such as a rod R having an axis 46 and which is axially reciprocable in opposite directions as indicated by arrow 48. As will be further appreciated from FIGS. 1–3, flux bar 22 has a length in the direction of movement 48 corresponding generally to the diameter of permanent magnet 12 and has a width transverse to direction 48 which corresponds substantially to the transverse length of legs 32 and 34 of sensing elements 24 and 26. Rod R has alternating lands 50 and grooves 52 providing alternating zones of different magnetic conductivity relative to transducer 10 as a result of different air gaps between the lands and grooves and sensor elements 24 and 26. Each land 50 and adjacent groove 52 provides a pitch distance P along rod R in the direction of movement 48, and the centers of sensing elements 24 and 26 as defined by ground legs 36 thereof are spaced apart in the direction of movement 48 a distance D which is proportional to pitch P and, preferably, equal to $\frac{1}{4}$, $\frac{3}{4}$ or $1\frac{1}{4}$ P, or other add multipliers of $\frac{1}{4}$ P. Proportionate spacing of the sensor elements is necessary in connection with determining the direction of movement of rod R relative to transducer 10 and, in this respect, avoids the output signals from the two sensors being identical and which identity would preclude differentiating between the signals to determine direction of movement.

Before describing the operation of the embodiment illustrated in FIGS. 1-3, reference is made to FIG. 4 of the drawing showing a transducer structure as described hereinabove but without flux bar 22, whereby sensor elements 24 and 26, are directly mounted on pole face 20 of permanent magnet 12 and in the same orientation relative to magnet axis 18 and the direction of movement of an object 48 as described hereinabove. In the structure shown in FIG. 4, the lines of flux in the magnetic field of permanent magnet 12 are generally radially of the permanent magnet relative to axis 18 about the periphery of the magnet whereby, with respect to each of the sensor elements 24 and 26, the lines of flux cut across legs 32 and 34 thereof differently relative to the corresponding ground leg 36. Therefore, for each of the sensor elements 24 and 26 there is an imbalance in the magnetic field being sensed by legs 32 and 34 of the corresponding sensor element as a result of the magnetic flux on radially opposite sides of ground leg 36 of each of the sensor elements being different. Therefore, with respect to rod R for example, displacement of the generally transverse edges of the lands and grooves of the rod relative to the sensor elements and the radial flux lines results in an imbalance in the outputs from the two legs of each element, whereby it is at best difficult to obtain accurate readout for determining the position, velocity and/or directional information sought with regard to the moving object.

As mentioned hereinabove, such field imbalance with the arrangement shown in FIG. 4 can be compensated for by adding resistors to the positive and negative legs of the sensing elements. However, the use of resistors as a compensating arrangement is limited to a given air gap and a given ambient temperature in that the sensing elements are temperature sensitive. It is neither practical, efficient nor desirable to attempt to control with precision either the air gap or ambient temperature in a given use situation. Moreover, even if the imbalance in the field is corrected through the use of resistors, any deviation from the given air gap and ambient temperature requirements results in inaccuracy of readout and increases the signal-to-offset error ratio problem referred to herein.

With the foregoing in mind and referring again to FIGS. 1-3 of the drawing, the positioning of flux bar 22 between the pole face of permanent magnet 12 and sensor elements 24 and 26 causes a distortion in the magnetic field generated by permanent magnet 12 which results in the lines of flux in the areas of legs 32 and 34 of each of the sensing elements 24 and 26 being constrained towards a direction transverse to the direction of movement 48 of the object being sensed. This promotes balancing the magnetic field in the area of each of the sensing elements 24 and 26 and thus across legs 32 and 34 on radially opposite sides of the corresponding ground leg 36 and, thus, results in improved accuracy with respect to the readout from the sensors. The area of most importance in connection with distortion of the magnetic field and constraint of the flux lines in the foregoing manner is the area immediately adjacent the laterally outer ends of legs 32 and 34 with respect to direction 48. Obtaining the desired transverse direction of the lines of flux in this area is promoted by providing the flux bar 22 to have a width in the lateral direction with corresponds substantially to that of legs 32 and 34 of the sensor elements. Furthermore, the transducer according to the present invention is not restricted either to a given air gap or to a given ambient temperature.

As mentioned hereinabove, the output signals from legs 32 and 34 of each of the sensor elements 24 and 26 are introduced to the corresponding one of differentiators 38 and 40, the output signals of which are introduced into suitable electronic processing devices 42 and 44. It will be appreciated that device 42 can, for example, be a digital process controller, digital to analog signal conditioner, or digital to binary coded decimal signal conditioner having output to device 44 which, for example, could be a counter, readout, monitoring instrument, serve controller, or microprocessor.

The use of flux bar 22 advantageously enables preassembly of magnetic field sensitive sensors 24 and 26 with the bar prior to the mounting thereof on the pole face of magnet 12. In this respect, the pull of magnet 12 is so strong and the sensors so fragile that assembly of the sensors directly on the pole face of the magnet as heretofore required had to be done with extreme care. Otherwise, the attraction can cause the sensors to impact against the pole face with such force as to cause the sensors to shatter. By first mounting the sensors on the flux bar, the latter provides a rigid support for the sensors which precludes such damage during mounting of the flux bar on the magnet.

As a representative example of the dimensions of a transducer made in accordance with the preferred embodiment, permanent magnet 12 has a diameter of about 0.250 inch and an axial height of about the same dimension, and cylindrical wall 14 has an inside dimension of about 0.500 inch and an outside dimension of about 0.625 inc. Flux bar 22 has a length generally corresponding to the diameter of magnet 12 and has a width transverse to the direction of movement of about 0.120 inch and a height above pole face 20 of magnet 12 of about 0.060 inch. Ferrite base 30 for each of the sensor elements 24 and 26 has a width transverse to direction 48 of about 0.120 inch, and each of the sensor elements has a thickness including base 30 and the material legs 32, 34 and 36 thereof of about 0.007 inch. As mentioned hereinabove, the width of flux bar 22 transverse to the direction of movement 48 corresponds generally to the length of legs 32, 34 and 36 of the sensor elements, and each of the sensor elements has a length between legs 32 and 34 in the direction of movement 48 of about 0.025 inch. It will be appreciated of course that sensor elements 24 and 26 are equally spaced on opposite sides of magnet axis 18, and that the spacing thereof is dependent on the pitch distance P. A preferred spacing is one and one-quarter of the pitch distance. A practical maximum air gap for the foregoing embodiment is about 0.030 inch, and the only limitation on a minimum air gap would be mechanical interference between the transducer and object.

Figure 5:
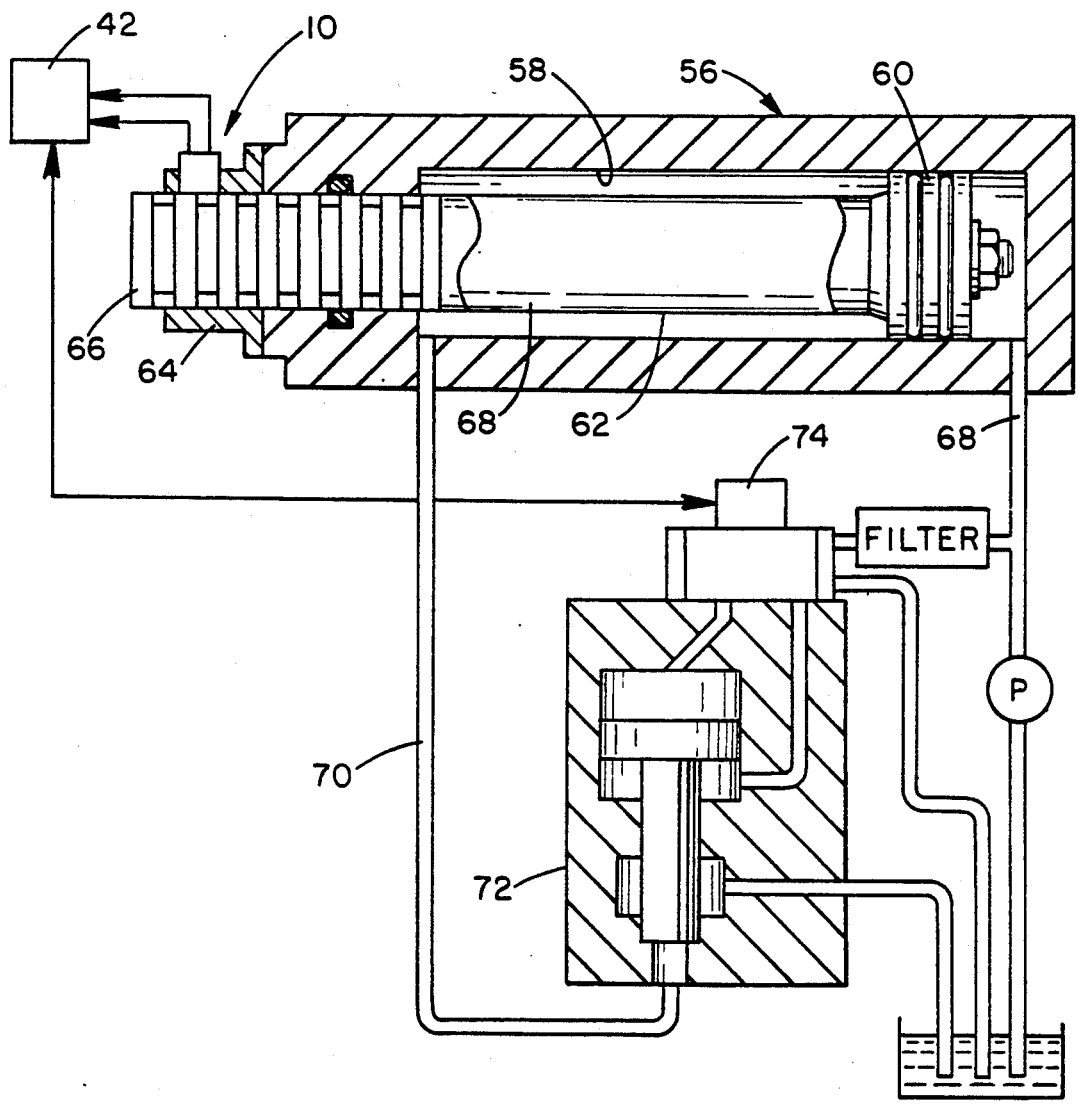
FIG. 5 is a schematic view, partially in section, showing use of a transducer in accordance with the present invention with the cylinder and piston components of a die casting machine.

One particular environment of use for the transducer in accordance with the present invention is in conjunction with positioning and monitoring the position, velocity and acceleration of the piston or ram of a metal die casting machine of the character disclosed in U.S. Pat. No. 3,956,973 to Pomplas, the disclosure of which is incorporated herein by reference. FIG. 5 of the drawing corresponds to FIG. 1 of the latter patent, and will be described briefly herein in connection with the transducer of the present invention. FIG. 5 illustrates a cylinder and piston arrangement which includes a cylinder 56 providing a piston chamber 58 receiving piston 60. Piston 60 is provided with a piston rod 62 which extends through an opening in one end of cylinder 56 and through a packing gland 64 secured to the latter end of the cylinder. Piston rod 62 is provided with threads 66 extending axially therealong from the outer end of the piston rod to a distance towards piston 60 corresponding to the stroke thereof. Preferably, the piston rod is provided with a sleeve 68 of non-magnetic material which is shrunk fit on the piston rod to overlie the entire length of the threads and provide a smooth surface for reciprocating movement of the piston rod relative to cylinder 56. The piston rod is of a magnetically conductive material, and the threads therealong together with the recesses therebetween provide alternating zones of different magnetic conductivity along the piston rod.

Cylinder 56 has fluid inlet and outlet lines 68 and 70 communicating chamber 58 with a source of hydraulic fluid under pressure through a suitable speed control valve 72 which is controlled by a suitable servo valve unit 74. It will be appreciated, of course, that the flow of hydraulic fluid under pressure into the piston chamber alternately on opposite sides of piston 60 results in displacement of piston rod 68 outwardly and inwardly relative to cylinder 56, and that the speed of displacement of piston rod 68 can be controller through valve 72. Transducer 10 in accordance with the present invention is suitable mounted on packing gland 64 and, as piston rod 68 moves axially outwardly and inwardly relative thereto, the sensing elements produce output signals which are respectively differentiated and fed as input signals to controller 42 which has an output signal to servo valve 74. In use, as the piston rod 62 moves axially, sensors 24 and 26 of transducer 10 generate pulse signals which are transmitted to controller 42 and which pulse signals provide the basis for determining the position, velocity and/or direction of displacement of the piston rod. In FIG. 5, controller 42 has an output to servo valve 74 which controls the hydraulic fluid pressure within chamber 58 of cylinder 56 and thus the position of the piston and piston rod 62. It will be appreciated of course that the sequence of the pulse signals from the two sensor elements of the transducer is indicative of the direction of movement of the piston rod and that the frequency of pulse signals is indicative of the speed of movement of the piston rod.

Figure 6:
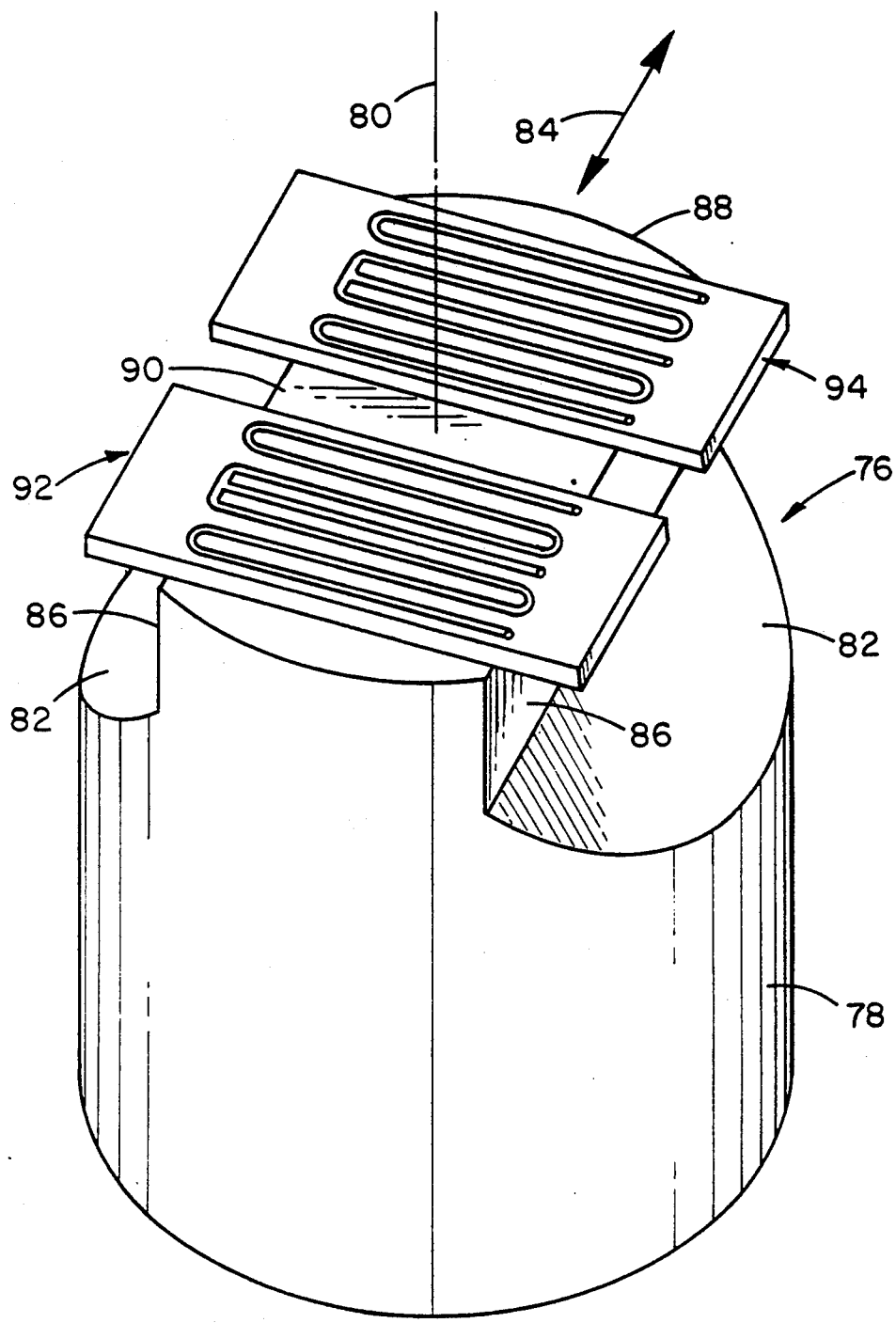
FIG. 6 is a perspective view of another embodiment of a transducer in accordance with the present invention.

Because of the hardness and the difficulty of machining samarium cobalt, it is preferred in connection with the use thereof for the permanent magnet to provide the flux bar as a separate element mounted on the flat pole face of the magnet as described herein. However, the desired distortion of the magnetic field of the magnet in the areas of the sensors on opposite sides of the magnet axis can be provided by configuring the pole face end of the permanent magnet to have an integral flux bar shaped end, as shown in FIG. 6 of the drawing. More particularly in this respect, permanent magnet 76 in FIG. 6 has a circular base portion 78 providing a magnet axis 80 and radially inwardly and upwardly tapered surfaces 82 on laterally opposite sides of the magnet with respect to the direction of relative movement 84 between the transducer and an object to be sensed. The upper end of magnet 76 terminates in a bar configuration having vertical side walls 86, end walls 88 defined by corresponding portions of the outer surface of the circular magnet, and planar pole face 90 transverse to axis 80. Magnetic field sensitive sensor elements 92 and 94 which may correspond structurally to sensor elements 24 and 26 described hereinabove are mounted on pole face 90 on opposite sides of magnet axis 80 with respect to the direction of relative displacement 84. Based on the dimensions set forth hereinabove with regard to transducer 10, base portion 78 of magnet 76 would have a diameter of about 0.250 inch and an axially height to pole face 90 of about 0.310 inch, and the bar shaped upper end portion would have a width between side walls 86 of about 0.120 inch and a height along side walls 86 of about 0.060 inch, and a length in the direction 84 corresponding to the diameter of base portion 78. Sensors 92 and 94 would be dimensioned as described hereinabove with regard to sensors 24 and 26. In use, it will be appreciated that the flux bar shaped upper end of magnet 76 operates to distort the magnetic field of the magnet in the areas of sensors 92 and 94 so as to constrain the lines of flux to a transverse direction relative to direction of movement 84, thus to balance the field across both legs of each of the sensor devices.

Figure 7:
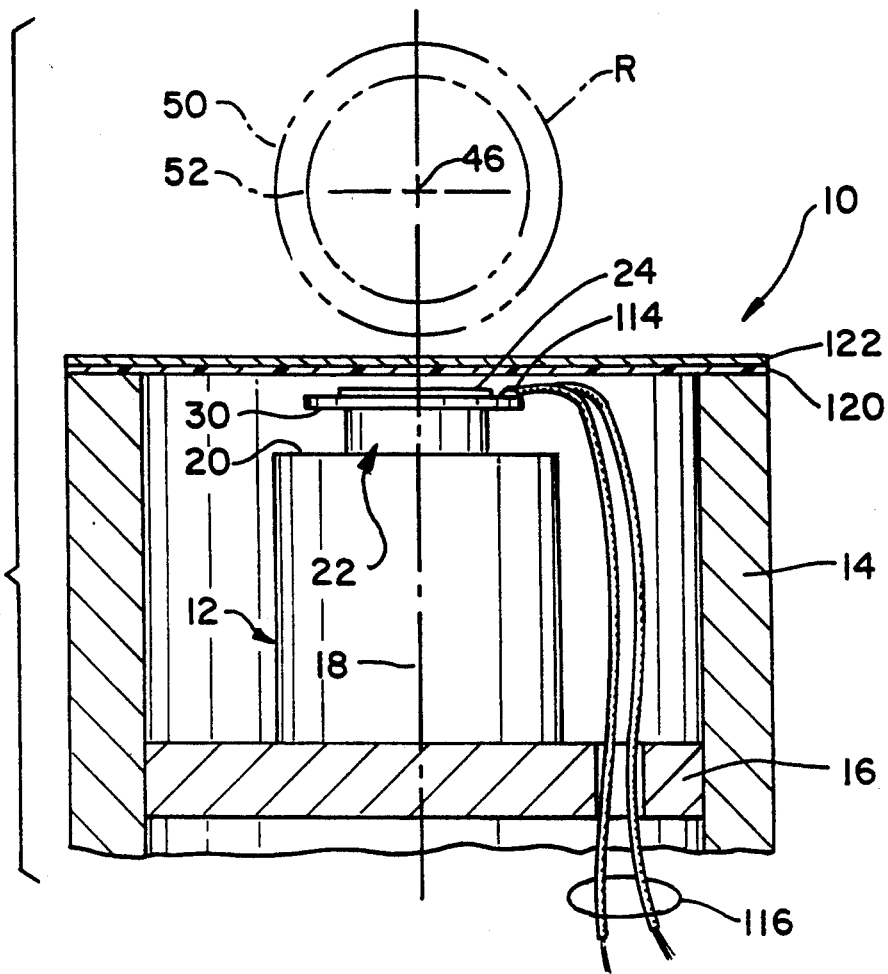
FIG. 7 is an elevation view, partially in section, of a transducer in accordance with the present invention and showing the protective features and electrical connections of the transducer of FIG. 3.

Referring to FIG. 7, the protective plates and the electrical connections of the arrangement of FIG. 3 are illustrated. A solder joint 114 connects lead wires 116 to the sensor circuits attached to the flux bar 22. Due to the physical size (height) of the solder joint 114, a small air gap must be provided between the joint surface and the protective stainless steel plates 122. The overall air gap is typically about 0.013 inches wide. A sheet of a non-conductive material, such as Kapton, is applied to the back side of the stainless steel protective plate 122 to prevent a short circuit between the solder joints 114, should the plate 122 flex toward the sensor elements 24 and 26, as by an externally applied force. Typically, even the slightest force against the joints 114 will crack the base 30 and render the sensor useless. The stainless steel plate 122 is typically about 0.005 inches thick, and the insulation layer is typically 0.004 inches thick. Overall, each of the layers including the stainless steel plate 122, the insulation layer 120, and the air gap, reduce the overall sensitivity and signal to noise ratio of the sensor through decreased magnetic flux. Further, a notable temperature dependance also results as a product of the arrangement of the sensor as in FIG. 7 though some protection is provided to the delicate circuitry.

Figure 8:
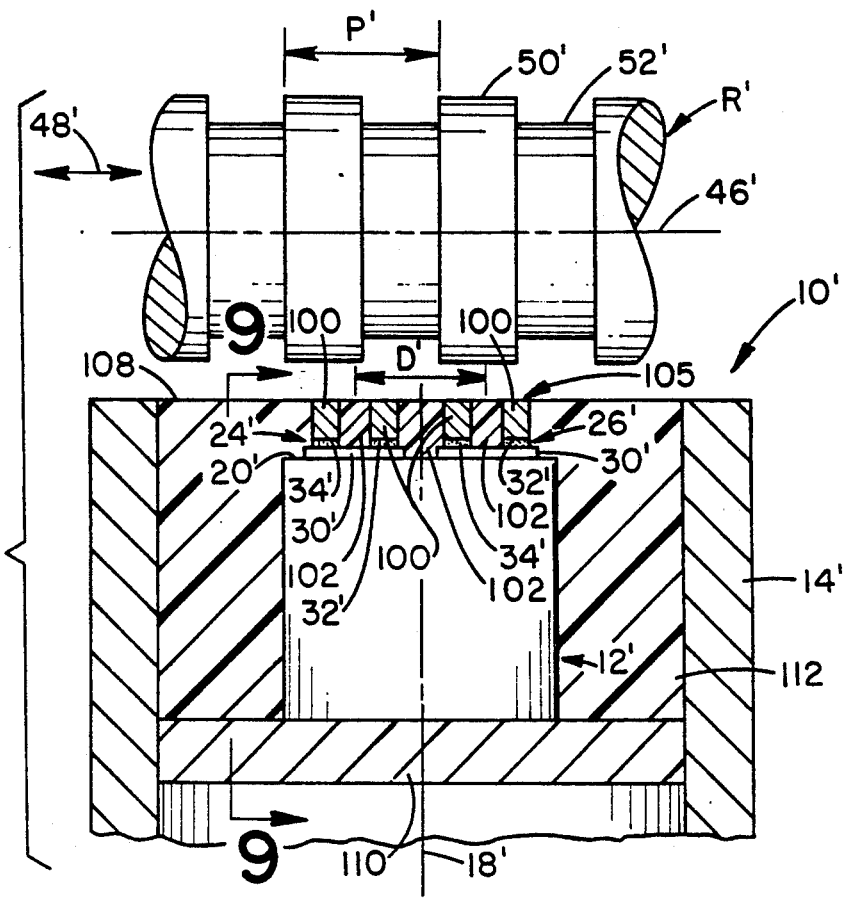
FIG. 8 is an elevation view, partially in section, of a transducer in accordance with the present invention and showing the transducer in motion sensing relationship with respect to a reciprocating object.
Figure 9:
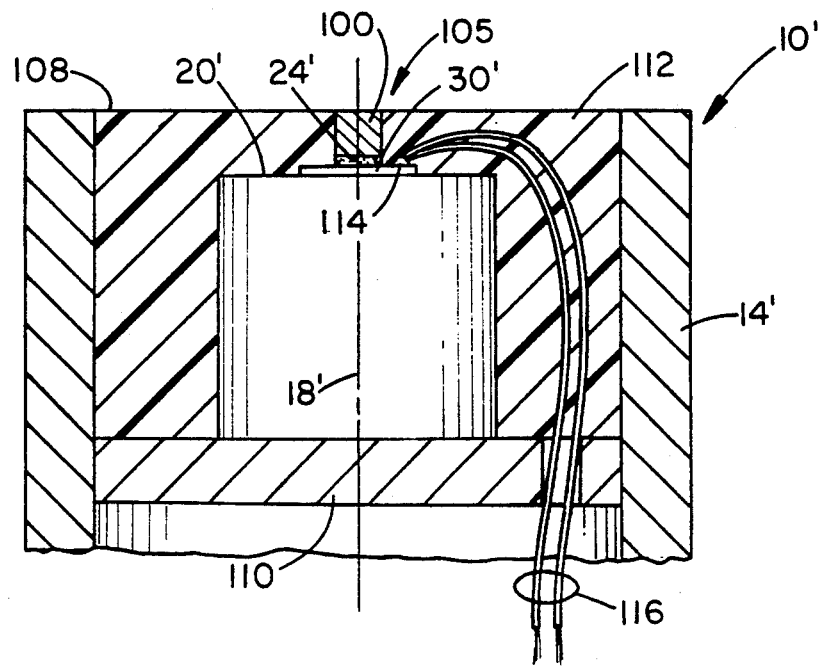
FIG. 9 is a sectional elevation view of the transducer taken along line 9—9 in FIG. 8.

With reference now to FIGS. 8-9, wherein structure similar to that in FIGS. 1-3 is denoted by like numerals with a prime (') suffix a transducer 10' is illustrated as being comprised of a cylindrical body 12' of permanent magnetic material such as samarium cobalt suitably mounted in a housing of mild steel reinforced by a cylindrical wall 14' radially spaced from the surrounding magnet 12'. Permanent magnet 12' has an axis 18', a planar pole face 20', and a laminated flux bar 105. The flux bar 105 is formed having sections of material having high permeability, such as ferrite and sections of material having low magnetic permeability, such as a ceramic material. A pair of magnetic field sensitive sensor elements 24' and 26' are mounted on the pole face 20' such as by an epoxy adhesive and held there in place by the ceramic filler 122. A laminated flux bar 105 is mounted to the sensor elements 24' and 26'.

In the embodiment shown, each of the sensor elements 24' and 26' is preferably a silicon magnetoresistor sensor of the type indicated above. Each of the sensor elements 24' and 26' is comprised of a thin base 30' ferrite on which is mounted a differential silicon resistor having a positive leg 32' and a negative leg 34'. The legs are connectable to wire leads 116 as by a solder connection 114 as shown in FIG. 9. The wire leads 116 are connected to differentiators as explained above.

As will be appreciated from FIGS. 8-9, transducer 10' is adapted to be positioned relative to a moving object of magnetically conducting material, such as a rod R' having an axis 46' in which is axially reciprocable in opposite directions as indicated by arrow 48'. As will be further appreciated from FIGS. 8-9, flux bar 105 has a length in the direction of movement 48' corresponding generally to or less than the diameter of permanent magnet 12' and has a width transverse to direction 48' which corresponds substantially to the transverse length of legs 32' and 34' of sensing elements 24' and 26'. Rod R' has alternating lands 50' and grooves 52' providing alternating zones of different magnetic conductivity relative to transducer 10' as a result of different air gaps between the lands and grooves and sensor elements 24' and 26'. Each land 50' and adjacent groove 52' provides a pitch distance P' along rod R' in the direction of movement 48', and the centers of sensing elements 24' and 26' as defined by ground connections 36' thereof are spaced apart in the direction of movement 48' a distance D' which is proportional to pitch P' and, preferably, equal to ¼, ¾ or 1¼ P', or other add multipliers of ¼ P'. Proportionate spacing of the sensor elements is necessary in connection with determining the direction of movement of rod R' relative to transducer 10' and, in this respect, avoids the output signals from the two sensors being identical and which identity would preclude differentiating between the signals to determine direction of movement.

Figure 10:
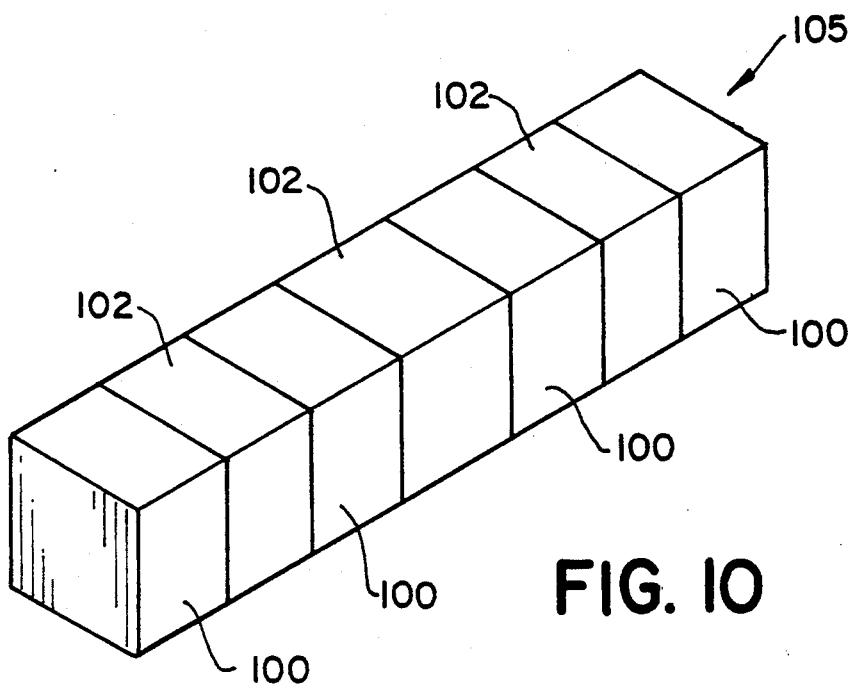
FIG. 10 is a perspective elevation view of the laminated field distorting flux bar of the present invention.

Referring now to FIG. 10, the laminated flux bar 105 of the preferred embodiment is illustrated wherein the bar is formed of alternating layers of a ferrite lamination 100 and a ceramic lamination 102. Each of the ferrite laminations 100 is formed for placement directly against each of the legs 32' and 34' of the sensing elements 24' and 26' with reference to the view of FIG. 8, a pair of ferrite laminations 100 are for use with a first magnetic field sensitive sensor 24', and the second pair of laminations are for use with the second magnetic field sensor element 26'. Accordingly, the relative spacings between the laminations of the flux bar 105 are determined primarily by the type of sensor elements used.

Figure 4:
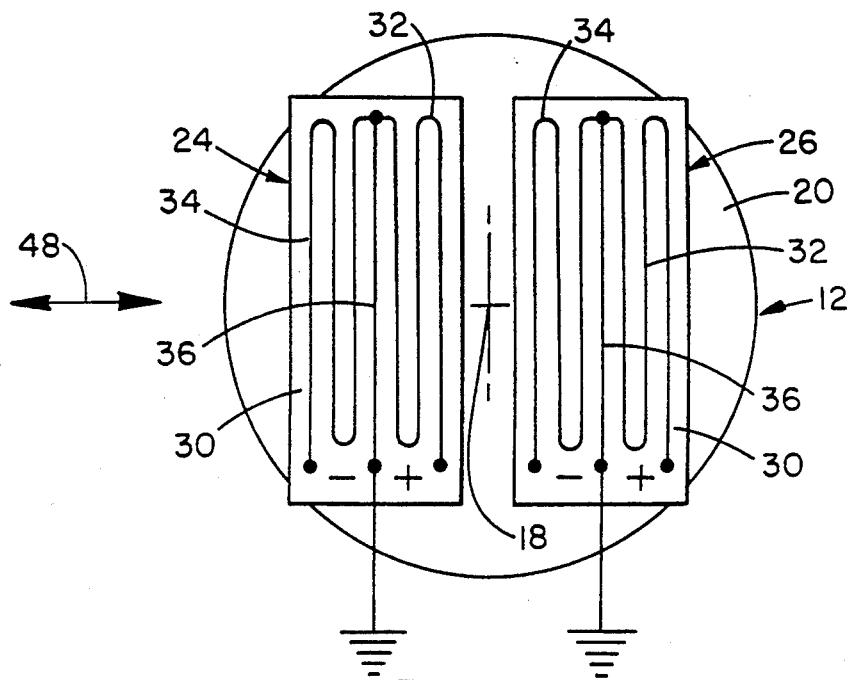
FIG. 4 is a plan view of a prior art transducer.

Referring to the deficiencies experienced through the use of the arrangement shown in FIG. 4, the laminated flux bar 105 provides for a concentration of the flux generated by the magnet 12' through the sensitive areas of the magnetoresistors. In addition to this concentration of flux, the air gap necessary in the arrangement of FIG. 7 is eliminated which also enhances the transmission of flux from the permanent magnet 12' to the rod R'.

With continued reference to FIGS. 8 and 9, the flux bar 105 is made to lie in a plane even with that of a plane 108' defined by the cylindrical wall 14'. A ceramic material such as alkyd silicate is used to fix the permanent magnet 12', along with the sensor elements 24' and 26' and flux bar 105, in place within the walls 14'. A circular disk of mild steel 110 is used to complete the magnetic path, allowing the flux from the bottom of the magnet 12' to pass into the cylindrical wall 14 and thereby upward in rod R'. As can be seen from FIGS. 8-9 the ends of the cylindrical wall 14', along with the laminated flux bar 105 and ceramic filler 112 define a plane 108 for exposure to a moving object such as a rod R'. It is a feature of the plane 108 that it is possible to contact the sensor 10' with a moving object, without incurring catastrophic damage to the device as may occur in the arrangement of FIG. 7.

Referring now to FIGS. 11a-11f, a process for manufacturing the laminated flux bar 105 and overall improved sensor 10' is illustrated. In FIG. 11a a ferrite billet 130 is illustrated as defining a cylinder which may be sectioned into disks such as with a diamond saw. FIG. 11b shows one such disk 132 having been sectioned from the ferrite billet 130. In the preferred embodiment, the disk 132 has a thickness of about 0.017 inches. In FIG. 11c, four disks 132 are coaxially stacked leaving a gap H between the disks 132 using a spacer 134. In the figure, only one spacer is shown, however, as will be appreciated, a plurality of spacers must be used to maintain the arrangement shown in the figure. The disks stacked in the spaced relationship define a column form 136. The spacer 134 is about 0.014 inches thick in the preferred embodiment.

A ceramic material may be injected into the spacings between the disks 132 to form a solid column form 136 as illustrated in FIG. 11d. The ceramic ideally has a matching temperature coefficient as that of the ferrite disks 132. In the preferred embodiment, the ceramic is an alkyd silicate, and the billet 130 is formed of "3C8" ferrite. Without a matching temperature coefficient $T_C$, the expansion rates of the materials will differ resulting in failure of the device. The solid column form 136 illustrated in FIG. 11d is sliced as by a diamond saw to remove a first section 138. The first section 138 is further sliced as shown in FIG. 11e to create a laminated field distorting flux bar 105 as shown in perspective view in FIG. 10.

Having arrived at the laminated flux bar 105, the magnetic field sensitive sensor elements 24' and 26' are mounted on the flux bar 105 as by a thin film of epoxy. Each of the ferrite laminations 100 are made to align with one of either a positive leg 32' or a negative leg 34' of the sensor elements 24' and 26'.

After the sensor elements 24' and 26' are mounted to the flux bar 105, the assembled unit is then affixed to the pole face 20' of the permanent magnet 12'. The resultant construction comprises thin ferrite bases 30' epoxied to the pole face 20' of the permanent magnet 12' with the positive and negative legs 32' and 34', integrally formed on the bases 30', epoxied to the ferrite laminations 100 of the laminated flux bar 105. The other pole face of the permanent magnet 12' is epoxied to the center of circular disc 110.

Using a smooth surface, the resultant assembly described above is placed within the cylindrical wall 14' on the end having the flux bar 105. Liquid ceramic material such as the alkyd silicate used for the flux bar, is poured into the cylindrical wall 14' and urged to fill all voids displacing air pockets, as by a vacuum chamber or by pressurizing the ceramic material. After the ceramic filler 112 has cured, a silicon rubber (not shown) is used to cover the exposed disc 110. As may be appreciated, the resulting sensor 10' is hardened for industrial application by the addition of the ceramic filler 112 wherein impact to the sensor plane 108 will cause little or no damage to the delicate faces of the sensor elements 24' and 26', as well as the brittle bases 30'. Further, the construction allows for a It concentrated flux from the magnet 12' and through the sensitive areas of the magnetoresistors due to the elimination of air gaps which typically have low permeability. Another feature of the arrangement of FIGS. 8-9 is a reduction in temperature sensitivity of the overall device. Assembly inaccuracies become more tolerable as the only effective air gap the flux path is between the object being sensed and the plane 108 of the sensor 10'.

While considerable emphasis has been placed herein on the structures and structural interrelationships between the component parts of the preferred embodiments, it will be appreciated that other embodiments of the invention can be made and that changes can be made in the embodiments herein illustrated and described without departing from the principles of the invention. In this respect, for example, Hall elements can be used for the magnetic field sensitive sensors, the primary disadvantages in doing so being the additional number of wires required relative to the preferred silicon magnetoresistor type sensors. As another example, the permanent magnet could be square rather than round. While a square magnet would have some tendency to improve the direction of the lines of flux in the areas of the sensor elements on opposite sides of the magnet axis, the flux bar arrangement according to the present invention is still necessary to obtain a balanced magnetic field across the entire length of each of the sensor elements in the direction of relative movement between the transducer and the object being sensed. It will be appreciated too that the permanent magnet can be made from a material other than the preferred samarium cobalt, and that the magnet, flux bar, and housing can be configured and dimensioned other than as described hereinabove in connection with the preferred embodiments. Furthermore, it will be appreciated that the transducer can be employed in connection with movable objects other than bars, such as gears, or other objects having or provided with alternating zones of different magnetic conductivity in the direction of sensing. These and other changes as well as other embodiments of the invention will be suggested or obvious to those skilled in the art upon reading the foregoing description of the preferred embodiments, whereby it is to be distinctly understood that the descriptive matter herein is to be interpreted merely as illustrative of the present invention and not as a limitation.

Having thus described the invention, it is claimed:

1. A sensor for sensing movement relative thereto of an object in a direction of movement, the object having zones of different magnetic conductivity, the sensor comprising:
    magnetic field producing means for producing a magnetic field near the object, the magnetic field producing means having a continuous planar pole face facing the object and a first thickness in said direction of movement;
    transducer means, mounted directly on said pole face, for generating an electrical signal responsive to the movement of the object, the transducer means having a first width transverse the direction of movement and a first length in said direction of movement; and,
    rectangular flux guide means, disposed between the object and the transducer means and having substantially said first width transverse the direction of movement and said first length in said direction of movement, for concentrating a portion of the magnetic field having passed through the transducer means to the object.

2. The sensor according to claim 1, wherein the transducer means comprises at least a pair of magnetoresistors mounted on said field producing means in a spaced apart relation in said direction of movement of said object by a distance proportional to a pitch distance defined by said zones of different magnetic conductivity.

3. The sensor according to claim 2, wherein the rectangular flux guide means is mounted on said transducer means.

4. The sensor according to claim 1, wherein said transducer means comprises a first and second magnetic field sensor means for sensing the concentrated portion of the magnetic field.

5. The sensor according to claim 4, wherein said rectangular flux guide means is a construction laminated in said direction of movement and having an overall length in said direction of movement substantially corresponding to said first thickness, the flux guide means comprising i) ferromagnetic material layers mounted on said first and second magnetic field sensor means, each of the ferromagnetic layers having a length in said direction of movement corresponding to said first length and ii) non-magnetic material layers interposed between and connecting said ferromagnetic material layers.

6. The sensor according to claim 5, wherein said ferromagnetic material is ferrite and said non-magnetic material is ceramic.

7. A sensor apparatus for sensing movement in a first direction of an object adjacent the apparatus and having alternating zones of different magnetic conductivity, the sensor apparatus comprising:
    cylindrical magnetic field generating means for generating a magnetic field, the magnetic field generating means having a longitudinal axis and a substantially planar first surface side facing said object;
    magnetic field sensor element means, mounted directly on said first surface side and on opposite sides of said longitudinal axis with respect to said first direction and having a first width transverse said first direction and a first length in said first direction, for sensing the magnetic field in relation to said object; and
    flux guide means directly connected to said magnetic field sensor element means for concentrating a portion of the magnetic field into passage through the sensor element, the guide means having i) said first width, ii) alternating layers of ferromagnetic material and non-magnetic material along said first direction, each ferromagnetic material layer having said first length and iii) an overall length in said first direction corresponding to the diameter of said magnetic field generating means.

8. The sensor according to claim 7, wherein the flux guide means is spaced from the magnet by the magnetic field sensor element.

9. The sensor according to claim 8, wherein the flux guide means is secured to the sensor element.

10. A transducer for producing electrical pulse signals in response to movement in a first direction relative thereto of an object having alternating zones of different magnetic conductivity, the transducer comprising:
    cylindrical magnetic field generating means for generating a magnetic field, the field generating means having a longitudinal axis perpendicular said first direction and a continuous planar end surface facing the object, the end surface having a first diameter;
    first and second magnetic field sensor means mounted directly on the end surface of the field generating means, the first sensor means being offset from said longitudinal axis on a first side of the end in said first direction of the movement of the object, and the second sensor means being offset from said longitudinal axis on a second side of the end opposite the first side, and each of the sensor means having i) a positive and negative circuit leg sensitive to the magnetic field, ii) a first length in said first direction, and iii) a first width transverse said first direction; and magnetic field guide means for concentrating a portion of the magnetic field through each of the positive and negative circuit legs, the guide means being directly connected layered magnetic material and non-magnetic material and having substantially said first width and an overall length substantially corresponding to said diameter, the magnetic material layers each having said first length.

11. The transducer according to claim 10, wherein the magnetic material of the guide means is disposed adjacent each of the positive and negative circuit legs.

12. The transducer according to claim 11, wherein the guide means is spaced from the field generating means by the first and second magnetic field sensor means.

13. The transducer according to claim 12, wherein the magnetic material is ferrite and the non-magnetic material is ceramic.

14. The transducer according to claim 12 further comprising:

housing means for housing the field generating means, the housing means having an opened end;

locating means, secured to the housing, for locating the field generating means within the housing;

means for securing the magnetic field guide means to the first and second magnetic field sensor means;

means for securing the first and second magnetic field sensor means to the magnetic field generating means;

filler means for filling the housing and encasing the field generating means therein to define an object-side surface including the filler means, the magnetic field guide means, and the housing opened end.

15. The transducer according to claim 14, wherein the magnetic material is ferrite, the non-magnetic material is ceramic, and the filler means is ceramic.

16. The transducer according to claim 15, wherein the object-side surface is substantially parallel the end surface of the magnetic field generating means to face the object.

17. The transducer according to claim 16, wherein the magnetic field generating means is a samarium-cobalt magnet, and the ceramic is an alkyd silicate.

18. The transducer according to claim 16, wherein adjacent zones of different magnetic conductivity on said object provide a pitch distance, each said first and second sensor means has a center in said first direction, and said centers of said first and second sensor means are equally spaced from said longitudinal axis and are spaced apart from one another a distance one and one-quarter of said pitch distance.

* * * * *